3,322,619
METHOD FOR KILLING INSECTS WITH ALKYL CYCLOHEXANONE
David E. Graham, Westfield, N.J., and Abdul Munim Nashu, New Haven, Conn., assignors to General Aniline & Film Corporation, New York, N.Y., a corporation of Delaware
No Drawing. Filed June 19, 1963, Ser. No. 288,912
5 Claims. (Cl. 167—30)

The present invention relates, in general, to alkyl cyclohexanones and, in particular, to a novel class of alkyl-substituted cyclohexanones containing from 8–12 carbon atoms in the alkyl group which find immediate and practical utility as pesticides.

The compounds of the invention can be conveniently represented by reference to the following general formula:

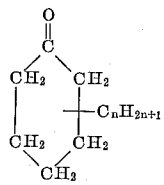

wherein the group $C_nH_{2n-1}$ represents an alkyl composed of carbon and hydrogen containing $n$ carbon atoms, $2n-1$ hydrogen atoms, wherein $n$ represents a whole positive integer in the range of from 8 through 12.

The compounds of the invention have been found to be active aphicides being particularly effective against bean aphids at low concentrations.

The compounds of the invention are prepared by the catalytic hydrogenation of an alkyl phenol to the alkyl cyclohexanol and subsequent catalytic dehydrogenation or chromic acid oxidation to the corresponding cyclohexanone. The reaction whereby the compounds of the invention can be prepared can be illustrated in the case of paranonylphenol:

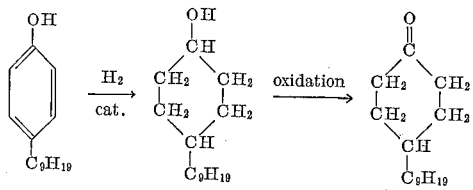

The starting materials employed in the manufacture of the compounds of the invention are alkyl phenols usually prepared by the condensation of a hydrocarbon with phenol. The products so produced are predominantly the para alkylphenols and may contain from 0.5–5% of the dialkyl phenol and from about 4–15% of the ortho alkylphenol. It is not necessary to separate the isomers for subsequent conversion to the cyclohexanone derivative since the utility of the resultant product does not necessarily depend on the position of the alkyl substituent on the cyclohexanone ring.

The alkyl phenols are further subjected to catalytic hydrogenation with a conventional hydrogenation catalyst such as nickel on kieselguhr under a hydrogen pressure in an inert atmosphere. After a period of from three to four hours hydrogenation is usually complete and the product, an alkyl cyclohexanol, recovered by any suitable means.

Subsequently, the alkyl cyclohexanol is converted to the corresponding cyclohexanone by catalytic dehydrogenation or by chromic acid oxidation as described in J. Org. Chem. 25, 1434 (1960).

In accordance with the procedure outlined above, alkyl-cyclohexanones can be readily prepared and include:

ortho-octylcyclohexanone
para-octylcyclohexanone
ortho-nonylcyclohexanone
para-nonylcyclohexanone
ortho-decylcyclohexanone
para-decylcyclohexanone
ortho-undecylcyclohexanone
para-undecylcyclohexanone
ortho-dodecylcyclohexanone
para-dodecylcyclohexanone The following examples will serve to illustrate the practice of the invention.

Example 1.—Preparation of nonylcyclohexanol

A one-gallon, stirred autoclave was charged, under a nitrogen atmosphere, with 1760 parts of nonylphenol, 500 parts of heptane, and 80 parts of a nickel on kieselguhr catalyst. The autoclave was then heated to a temperature of 175° C. with stirring. The temperature was maintained at 175° C. and the stirring stopped momentarily while hydrogen was introduced into the autoclave and pressured to a pressure of 1600 pounds per square inch gauge. The stirring was then resumed and an exothermic reaction occurred. Hydrogen pressure was maintained at between 1600 and 1200 pounds per square inch gauge by the addition of more hydrogen whenever the pressure dropped to 1200 pounds per square inch gauge. The reaction proceeded over a three to four hour period whereupon it was held at that temperature and at 1600 pounds per square inch gauge for an additional one hour after which no more hydrogen was consumed.

The nonylcyclohexanol was isolated by fractional distillation as a clear, colorless viscous liquid and was identified by infra red and ultra violet spectra. The product, which was obtained in a yield of 85–90% of theory, was characterized by the following properties:
Boiling point, 141–160° C. at 5 mm. of Hg;
Refraction index ($n_D^{25}$) of 1.4775–1.4785;
Hydroxyl number of 243–250.

Example 2.—Preparation of nonylcyclohexanone

A solution of 480 parts of sodium dichromate, 540 parts of 95% sulfuric acid and 2000 parts of water was added over a period of 40 to 50 minutes to a well stirred slurry of 904 parts of nonylcyclohexanol and 800 parts of water. The reaction temperature rose to a temperature of from 65° C.–75° C. during this addition. The stirring was continued until the reaction mass cooled to room temperature. The nonylcyclohexanone was extracted with a mixture of heptane and cyclohexane; the extracts combined and washed with 5% sodium hydroxide solution and then with water. The hydrocarbon layer was then dried over anhydrous sodium carbonate.

The solvent was stripped off and the product fractionally distilled under reduced pressure, and there was provided a water-white liquid which boiled at a temperature of 120° C.–126° C. at 2 millimeters of mercury pressure. The yield was 717–806 parts of product representing a yield of 80 to 90% of theory. The product obtained was characterized by the following properties:
Carbonyl number, 231–235;
Refractive index ($n_D^{25}$) of 1.471–1.473.

The product showed a characteristic carbonyl bond absorption in the infra red spectrum.

In an analogous manner other alkyl cyclohexanones can be readily produced by subjecting the corresponding alkyl cyclohexanol to chromic acid oxidation as set forth above.

Example 3

In demonstrating the pesticidal activity of the compounds of the invention, 4-nonylcyclohexanone was selected as a representative candidate for testing. A one percent stock solution was prepared by dissolving one gram of 4-nonylcyclohexanone in 5 to 10 milliliters of an appropriately innocuous solvent, such as water, acetone, methanol, or ethanol, as required. To this solution there was added three drops (0.1 gram) of mixed emulsifiers, and the resulting solution was diluted to 100 milliliters with water.

The mixed emulsifiers referred to above are a blend of equal volumes of the following:

Triton X–155 (Rohm and Haas)
Triton X–161 (Rohm and Haas)
Igepal CO–430
Igepal CO–630
Tergitol NPX (Union Carbide Corporation).

Where the solubility of the test candidate is limited in innocuous solvents or where water solutions cannot be made from the sample, one gram can be ground with the mixed emulsifiers in the amount referred to above and a limited amount of water in a tissue grinder.

In order to insure that the solvent and emulsifiers employed in the preparation of the test solutions are not affecting the results, or that the insects are not merely being drowned, a control test is run simultaneously employing an aqueous solution of the solvent and emulsifier, but without any of the insecticide under test.

A test solution was then prepared by taking a portion of the 1% stock solution and diluting to 0.05% concentration so as to represent the application of 500 parts per million.

In testing the pesticidal activity of 4-nonylcyclohexanone as to the rate of kill against Mexican bean aphids, the following test procedure was employed.

Two-inch diameter pots containing six to ten nasturtium plants infested with Mexican bean aphids were removed from a stock culture. The number of aphids to be tested is standardized to 100 to 150 individuals by trimming off plants containing excess aphids. The plants are then sprayed on a revolving turntable with a De Vilbis spray gun as 20 pounds' pressure for 30 seconds. About 30 milliliters of the test solution is applied which is enough to wet the plant to the point of run-off. After spraying, the plants are placed on their sides in a Petri dish on a sheet of white standard mimeograph paper which has been previously ruled into squares to facilitate counting. The paper is ringed with Tanglefoot glue to prevent the test insects from escaping. Counts are made of the insects which have fallen to the paper and those left on the plant 24 hours after the application of the test solution.

The following table reflects the results obtained after the application of of 4-nonylcyclohexanone at a concentration of 0.05% as described above:

TABLE I.—MEXICAN BEAN APHID

| Compound (0.05%) | Living | Dead | Percent Kill |
|---|---|---|---|
| 4-nonylcyclohexanone | 12 | 129 | 91.0 |
| Control | 261 | 53 | 17.0 |

The 91% kill obtained with 4-nonylcyclohexanone can be said to compare favorably with the results obtained using such recognized commercial products as DDT, vinylbenzene hexachloride, and diazinon.

While the invention has been described in its various embodiments and specifically illustrated in the preceding examples with respect to 4-nonylcyclohexanone and means for its preparation and use, it is apparent that the invention is not subject to restriction thereto since obvious modifications thereof will occur to persons skilled in the art. Therefore, it is intended that the invention shall include all such modifications and be interpreted as being applicable thereto insofar as the state of the art permits.

What is claimed is:

1. A method for killing insects which comprises contacting said insects with a compound selected from the group consisting of ortho- and para-alkyl cyclohexanone containing from 8 through 12 carbons in the alkyl group.

2. A method for killing insects which comprises contacting said insects with an alkyl cyclohexanone of the formula:

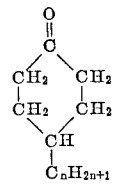

wherein the group $C_nH_{2n+1}$ represents an alkyl composed of carbon and hydrogen containing $n$ carbons, $2_{n+1}$ hydrogen atoms, wherein $n$ represents a whole positive integer in the range of from 8 through 12.

3. A method for killing insects which comprises contacting said insects with an alkyl cyclohexanone of the formula:

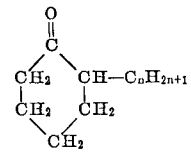

wherein the group $C_nH_{2n+1}$ represents an alkyl composed of carbon and hydrogen containing $n$ carbons, $2_{n+1}$ hydrogen atoms, wherein $n$ represents a whole positive integer in the range of from 8 through 12.

4. A method as defined in claim 2 wherein the alkyl cyclohexanone is p-nonylcyclohexanone.

5. A method as defined in claim 3 wherein the alkyl cyclohexanone is o-nonylcyclohexanone.

References Cited

FOREIGN PATENTS 701,074   7/1936   Germany.

OTHER REFERENCES

Chem. Abstracts, vol. 50 (1956), p. 14577(d).
Petrov et al., Chem. Abs., vol. 56, col. 7155C (1962).

ALBERT T. MEYERS, *Primary Examiner.*

LEON ZITVER, JULIAN S. LEVITT, *Examiners.*

GEORGE A. MENTIS, *Assistant Examiner.*

UNITED STATES PATENT OFFICE
CERTIFICATE OF CORRECTION

Patent No. 3,322,619                       May 30, 1967

David E. Graham et al.

It is hereby certified that error appears in the above numbered patent requiring correction and that the said Letters Patent should read as corrected below.

Column 1, line 27, for "$CnH_{2n-1}$" read -- $C_nH_{2n+1}$ --;

line 29, for "2n-1" read -- 2n+1 --; column 3, line 55, for "of of" read -- of --.

Signed and sealed this 18th day of June 1968.

(SEAL)
Attest:

Edward M. Fletcher, Jr.                       EDWARD J. BRENNER
Attesting Officer                            Commissioner of Patents